(12) United States Patent
Bennett et al.

(10) Patent No.: US 7,103,549 B2
(45) Date of Patent: Sep. 5, 2006

(54) METHOD FOR IMPROVING SPEECH RECOGNITION PERFORMANCE USING SPEAKER AND CHANNEL INFORMATION

(75) Inventors: Steven M. Bennett, Hillsboro, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 09/815,440

(22) Filed: Mar. 22, 2001

(65) Prior Publication Data

US 2002/0138272 A1  Sep. 26, 2002

(51) Int. Cl.
*G10L 21/00* (2006.01)

(52) U.S. Cl. ............... 704/270; 704/270.1; 704/275

(58) Field of Classification Search ............. 704/275, 704/270.1, 246, 255
See application file for complete search history.

(56) References Cited

U.S. PATENT DOCUMENTS

| | | | | |
|---|---|---|---|---|
| 4,805,219 A | * | 2/1989 | Baker et al. ............... 704/241 |
| 5,832,441 A | * | 11/1998 | Aaron et al. .............. 704/276 |
| 6,085,080 A | * | 7/2000 | Rahikainen et al. ........ 455/403 |
| 6,212,498 B1 | * | 4/2001 | Sherwood et al. .......... 704/244 |
| 6,308,155 B1 | * | 10/2001 | Kingsbury et al. ......... 704/256 |
| 6,363,348 B1 | * | 3/2002 | Besling et al. ........... 704/270.1 |
| 6,415,257 B1 | * | 7/2002 | Junqua et al. .............. 704/275 |
| 6,480,825 B1 | * | 11/2002 | Sharma et al. ............. 704/270 |
| 6,493,669 B1 | * | 12/2002 | Curry et al. ............... 704/257 |
| 6,513,010 B1 | * | 1/2003 | Lewin et al. ............. 704/270.1 |
| 6,519,562 B1 | * | 2/2003 | Phillips et al. ............. 704/240 |
| 6,526,381 B1 | * | 2/2003 | Wilson ....................... 704/251 |
| 6,549,883 B1 | * | 4/2003 | Fabiani et al. ................ 704/10 |
| 6,622,140 B1 | * | 9/2003 | Kantrowitz .................... 707/5 |
| 6,631,348 B1 | * | 10/2003 | Wymore ..................... 704/233 |
| 6,823,306 B1 | * | 11/2004 | Reding et al. .............. 704/244 |
| 6,848,080 B1 | * | 1/2005 | Lee et al. .................... 715/533 |
| 6,963,633 B1 | * | 11/2005 | Diede et al. ............. 379/88.03 |

\* cited by examiner

*Primary Examiner*—Richemond Dorvil
*Assistant Examiner*—Michael N. Opsasnick
(74) *Attorney, Agent, or Firm*—Sharmini N. Green

(57) ABSTRACT

A method for improving performance of speech recognition systems. Characteristics of the user and communication channels used by the user may be used to more accurately select the speech model used for that user.

18 Claims, 4 Drawing Sheets

METHOD FOR IMPROVING SPEECH RECOGNITION PERFORMANCE USING SPEAKER AND CHANNEL INFORMATION

BACKGROUND

1. Field

This disclosure relates to speech recognition systems, more particularly to improving the performance of such systems using speaker and channel information.

2. Background

Speech recognition systems offer users a convenient interface through which they can interact with any number of other systems. These systems allow users to speak directly 'into' their computers for both content and commands. Voice mail and other telephone-based systems offer the option of "press or say" the appropriate command or numbers.

Speech systems are especially attractive to highly mobile users, who may want to make travel reservations, leave messages, access e-mail and perform other tasks using any available phone. Additionally, as speech recognition technology improves and becomes less expensive, these systems are moving from simple command and control to allowing users to create text and other types of content from converted speech. However, speech is uniquely individualized for each user. Accents, native languages, and gender, among others, are all factors that affect the speech of the user and therefore affect the accuracy of the speech recognition technology. Modeling the user and matching the speech recognition engine to the user can be problematic. Methods and processes that allow for finer granularity in matching the speech recognition engine to the user are useful and needed.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
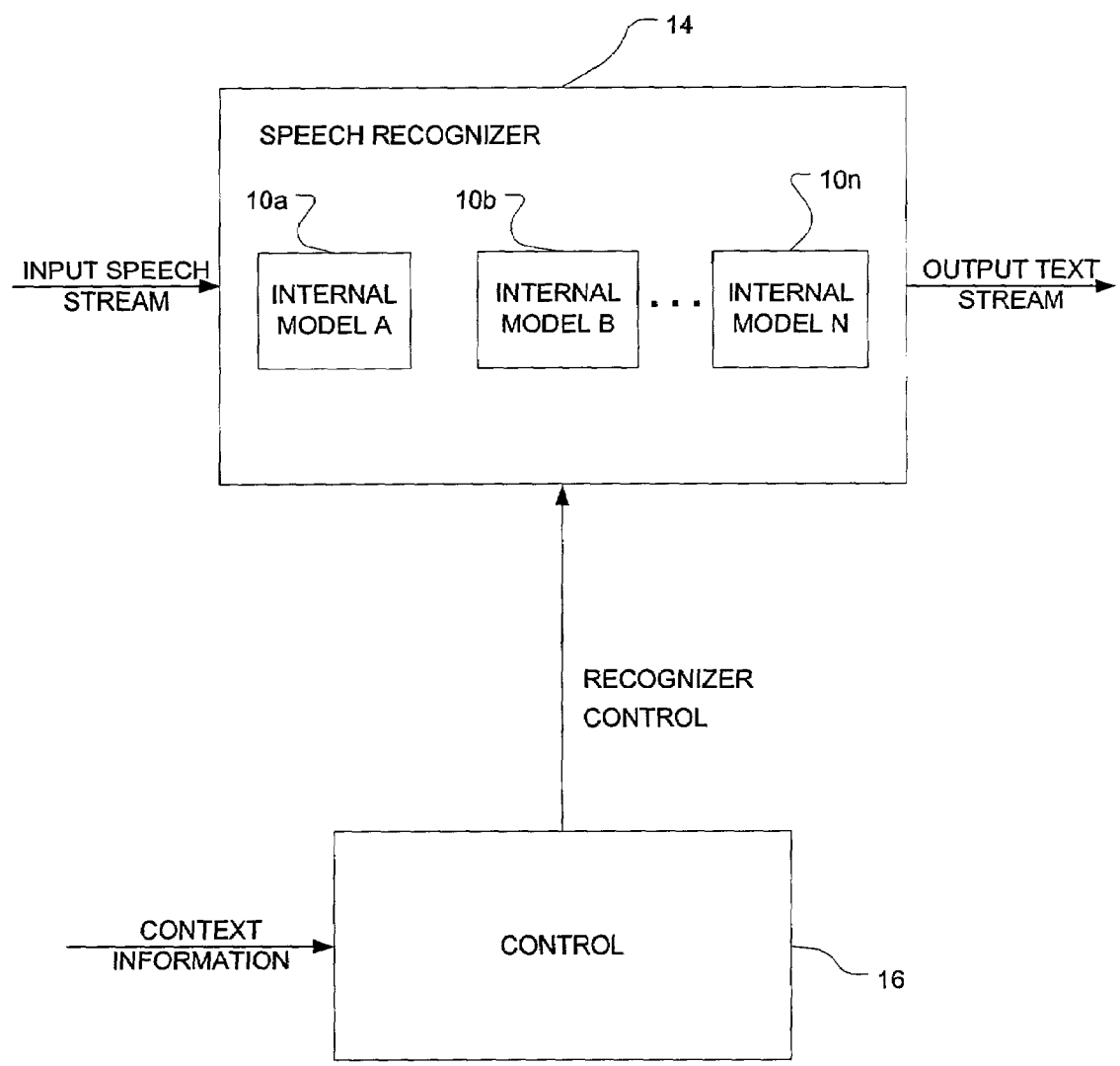
FIG. 1 shows a block diagram of one embodiment of a speech system having speech models matched to user and/or communication channel information.

In some speech recognition applications, users are offered a wide variety of services in a subscription fashion. These systems allow the user to browse various directories of information, access voice mail, to have e-mail read to them and to create e-mail by dictation. In these systems, as well as many other types of speech recognition systems, information can be gathered about the user and the communication channel. This information may come directly from the user or from other sources when the user originally sets up an account. Additionally, information may be acquired at the time of the interaction with the user, either directly from the user or the communication network, for example.

Note that many domains exist in which users interact with speech systems, e.g. home automation, voice-over-IP, ubiquitous computing, telematics, etc. In this document, application of the invention is described using the familiar example of a telephone call to a speech system. It must be noted that this example domain and language in no way limits the scope of this invention, as the invention could be applied to any speech system interaction.

Although subscription services are one possibility, it must be noted that any kind of speech recognition system that provides either a user account or a sign up process may have this type of user information. Even anonymous services may leverage network identification services like caller-id to identify communication channel properties and users. Other types of network services may allow analysis of the network and its characteristics. A system programmed to streamline initial registration may infer defaults based on name, address or telephone number, since these will often provide indicators as to gender, ethnicity, locale and communication channel characteristics.

The user information may include such things as gender, age, native language, accents, ethnicity, home region, as well as many other factors that may affect the person's speech. This information can be used to identify a speech model and speech recognizer configuration parameters catered most closely to the user. Several speech models are based upon gender and whether or not someone speaks English as a first language. Other systems may have models for several different accents, either from other countries or from regions of the user's native country. Speech recognizer configuration parameters may include information on noise characteristics, prosody, etc. The remainder of this disclosure refers only to speech models, but it should be understood that this includes these speech recognizer configuration parameters as well.

Information on the communication channel is needed to better match the model used by the speech recognizer to the actual conditions of the call. The user could be asked a series of questions, either during account set-up or even as part of the initial session with the system, which will identify typical communication channel characteristics. These may include the type of connection, such as landline or cell phone, or possible identification of the noise characteristics of the background, such as high, medium or low. Other information can be gathered over subsequent user interactions with the system.

Information about both the user and communication channel may be acquired automatically and dynamically. Caller-ID and similar network based facilities used in conjunction with databases mapping calling number to channel characteristics may be used to identify communication channel characteristics. Digital signal processing techniques exist to estimate characteristics of the communication channel in use and the speaker. For example, the use of a cell phone is detectable with high probability using these techniques. This dynamically generated information may be used along with any information available as described above. These can be unreliable estimations of the user and channel characteristics but are still useful, as is any information about factors that may affect a person's speech or the communication channel. This information can be used to more closely match speech models to the user and/or the channel, increasing the accuracy of speech recognition.

FIG. 1 shows one embodiment of a speech system capable of selecting speech models that best match the user and/or the communication channel characteristics. Within the system are several speech models, such as those shown by 10a–10n. It must be noted that the notation 'Internal Model N' does not mean that there are only A–N speech models. The notation 'N' is merely to designate that the actual number of models is not restricted. The choice of the number and types of models are left to the system designers.

The input speech stream enters the recognition engine 14. Context information is accessed by the control 16. The control 16 uses this information to select the appropriate model 10. Note that in some implementations, this selection may be done by the control 16 accessing an API in the recognition engine 14 while in others, it may be through configuration files or other input to the speech recognizer 14. This architecture is only provided as an example and is not intended to limit the scope of the invention in any way.

A speech recognition system such as the one in FIG. 1 will use the information to map a user and/or communication channel to a speech model for higher accuracy in recognizing speech. The mapping may be very simple to very complex depending upon choices made by the system designers, as will be discussed in more detail below. Note that recognizers may accept control information, such as available noise or channel information, to improve their performance. Pieces of the context information described above may be provided to the recognizer to improve its performance. Predicted or profile based contextual information can be used not only to select the model, but also to provide control information to improve performance.

Figure 2:
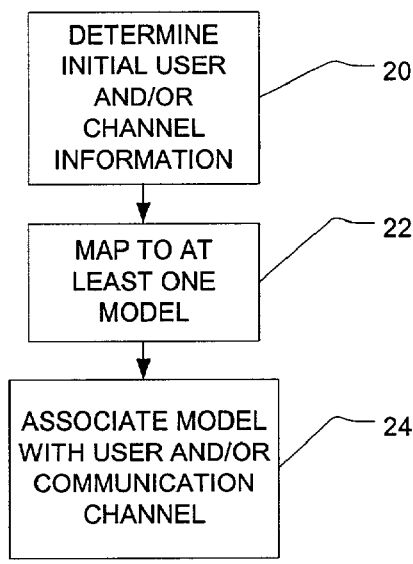
FIG. 2 shows a flowchart of one embodiment of performing an initial match of a speech model to a user and/or communication channel, in accordance with the invention.

FIG. 2 shows the method used to associate speech models with a particular user or communication channel. At 20, the system determines basic initial information as discussed above, perhaps including user and channel characteristics such as gender, location, calling habits, etc. As mentioned above, the information may be received from the user, or from the system. Once this information is determined at 20, the system can then map the information to at least one speech model at 22. The mapping function may be based upon a weighting of the different factors and then a selection of the best engine for the more heavily weighted factors. Several different approaches are possible and the invention is not limited to any one particular type of mapping process.

If a direct correlation between the information available and the models does not exist, heuristics can be used to perform the mapping function. When the most appropriate speech model is identified, that model is then associated with the user or communication channel at 24 . The user or communication channel with which the model is associated is called the mapping target. The model is called the default model for the mapping target.

Several alternative models may be identified as well as a default model. For example, the user information may indicate that most interactions with the system will be via landline connections. Therefore, the default model may be a landline speech model for that user. However, an alternative model for a cell phone connection may also be designated. In some systems, all available models may be designated as alternative models for a given user or communication channel.

Figure 3:
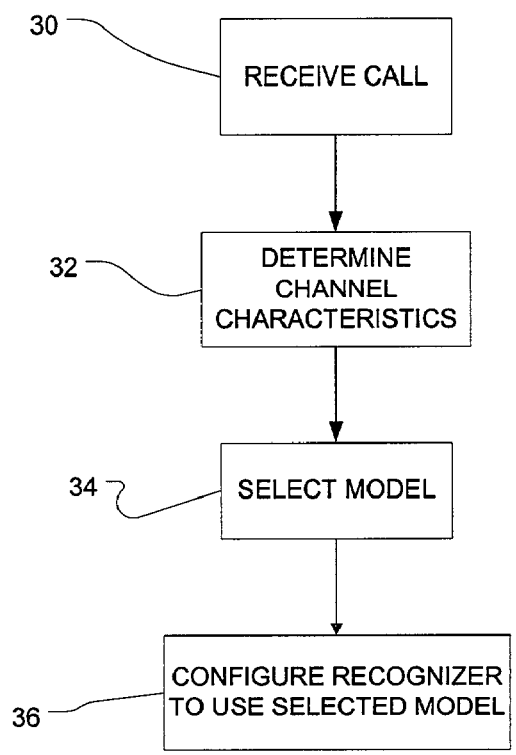
FIG. 3 shows a flowchart of one embodiment of a method to dynamically adjust selection of speech models based upon information received during an active call, in accordance with the invention.
Figure 4:
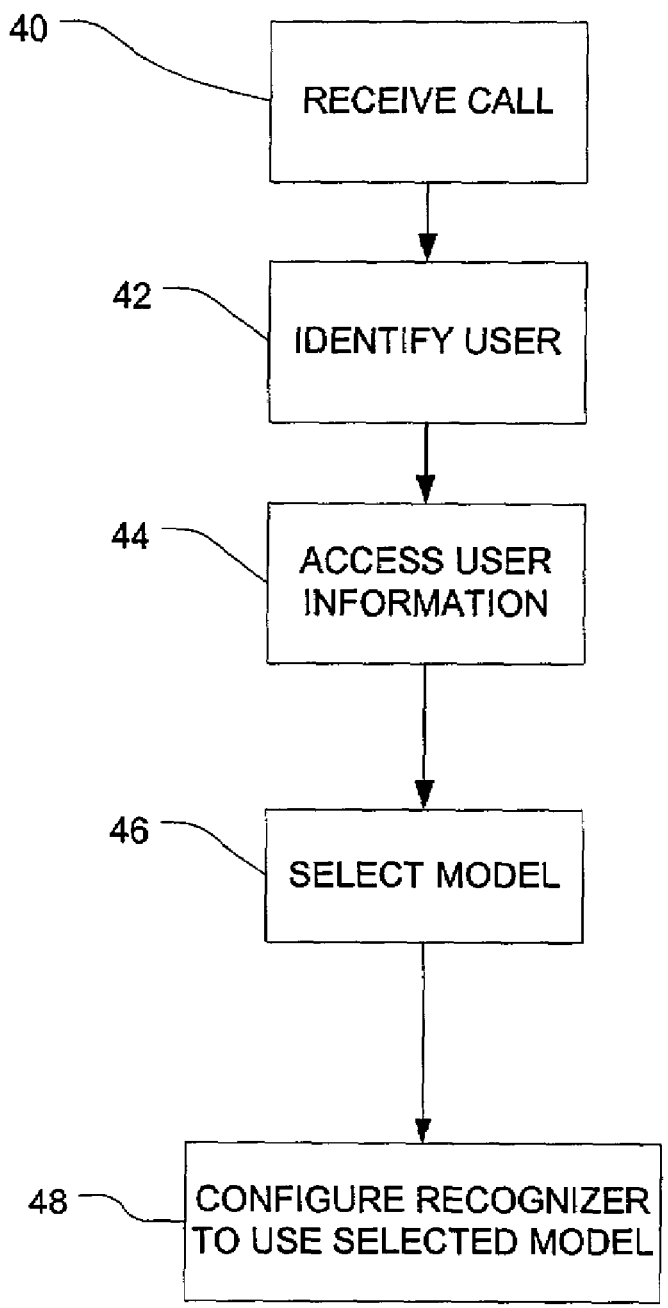
FIG. 4 shows a flowchart of another embodiment of a method to dynamically adjust selection of speech models based upon information received during an active call, in accordance with the invention.
Figure 5:
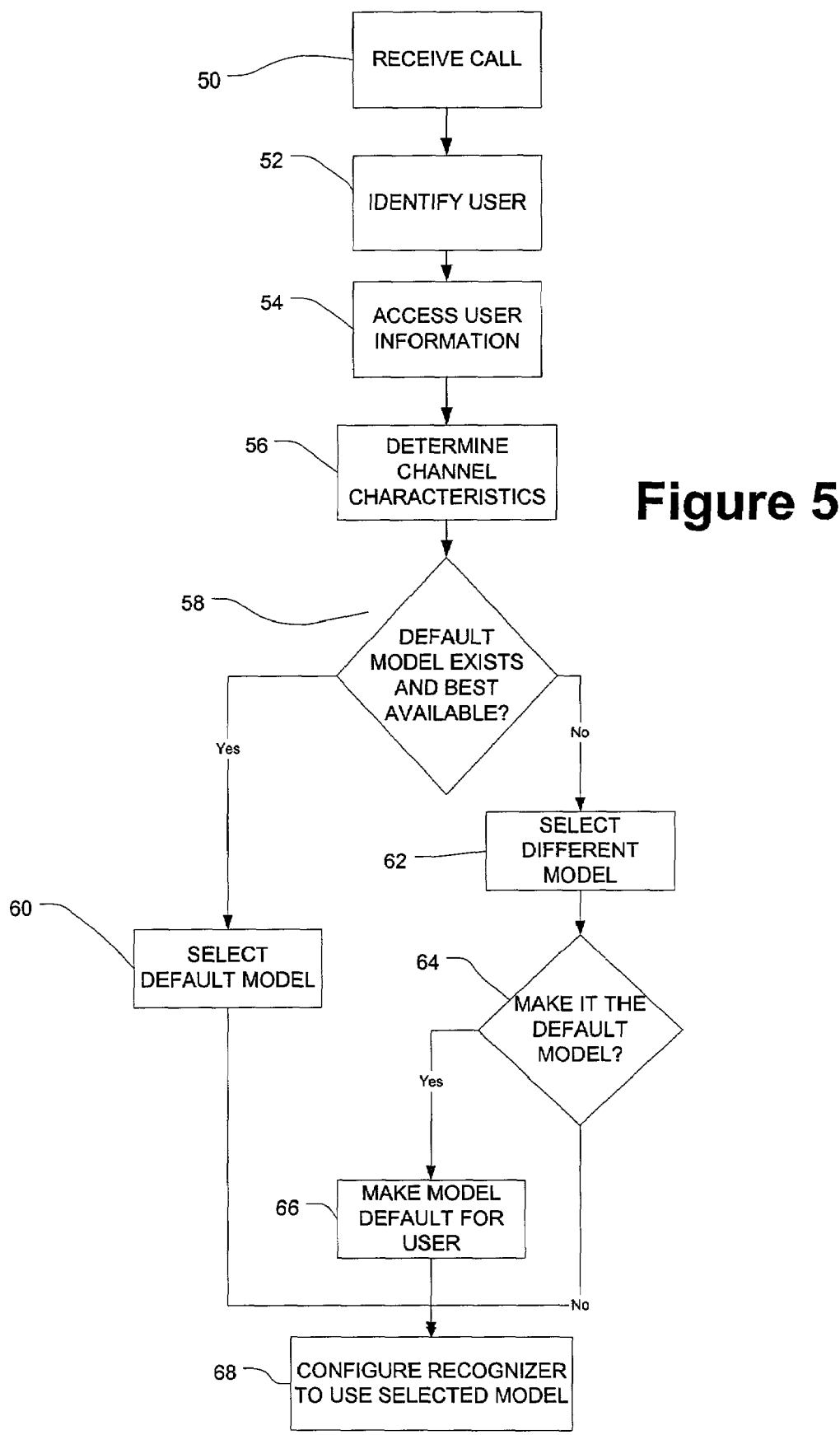
FIG. 5 shows a flowchart of another embodiment of a method to dynamically adjust selection of speech models based upon information received during an active call, in accordance with the invention.

Having identified a default speech model associated with a user or communication channel, it is now useful to discuss events that may occur in further interactions between the user and the speech recognition system. FIG. 3, FIG. 4 and FIG. 5 show flow charts of three embodiments in which the speech model is selected based upon the user and/or call characteristics.

FIG. 3 shows an anonymous service employing the invention. A call is received at 30. Channel characteristics are determined at 32. The characteristics of the communication channel may be determined during the set up of the call, such as landline or cell phone, as well as background noise. Additionally, the channel information may indicate factors such as what part of the country or region the user is calling from. The information about the communication channel is used at 34 to select a speech model using the mappings determined in the process in FIG. 1. This embodiment does not use any user-specific information, though it may use user-related information derived from communication channel properties, e.g. the country or region from which the call originates.

As an example, a user calls into a system that has only two speech models: one for cell phone calls and one for landline calls. If the call is from a cell phone, the cell-phone model is selected. Likewise, a call from a landline phone would cause selection of the landline model. The recognizer is configured to use the selected model at 36. This embodiment determines the model to use at the time of the call and is dependent on determining communication channel characteristics. If this information cannot be determined, a general-purpose speech model may be employed, as is the practice in current systems. Alternatively, a model may be chosen probabilistically based on system usage data.

FIG. 4 shows a system that can identify the user. This system may have a default model assigned to the user as discussed previously. At 42, the system identifies the user as discussed below. At 44, the process will access user-specific information, including the default speech model assigned to the user. This model will then be selected in 46. The speech recognizer is configured to use this model at 48. This embodiment does not use channel information.

The information about the user and any default speech model is dependent upon being able to identify the user. This may be done by identification of the calling number, which identifies the communication channel and device, but does not uniquely identify the user because more than one person may utilize any given phone. However, identification of the communication channel or device may be sufficient to identify the user in many cases. Typically, however, user identification will be done through the user's identifier such as an account number or personal identification number. Identification of the user allows the system to access the information associated with the user at 44, including the default speech model. A process similar to that in FIG. 2 would have been used to determine the default speech model.

FIG. 5 shows a system that adapts the speech model used based on the individual user and channel characteristics. A call is received at 50 and the user is identified as discussed above at 52. The system determines communication channel characteristics at 56 and accesses user information, including the user's default model at 54. Using information from these steps, the system checks the default model to determine if that model is the best for this call. This would be done at 58.

If the default model is not the best available for this call a different model may be selected at 62. This new model may be used only for the duration of the current call, or may become the default model associated with the user. This determination is made at 64. If the default model for the user is to be changed, this is done at 66. At 58, if the default model is determined to be the best available for this call, it would be selected at 60. The speech recognizer is configured to use the selected model at 68. Note that in some cases, the system may not be able to determine communication channel characteristics. In these cases, the user's default model is used.

If the default model is changed, or none was previously selected, the current model could be designated the default model at 66. This could then be associated with the user, either at that point in time, or after the call has ended. For reasons relating to conservation of computation resources, some of the analysis of the default model may be done off-line. Likewise, association of a model with a user may be done off-line or while the user interacts with the system.

As an example of determining if a default model is the best available for a given call, assume that during the initial moments of the call the system may have identified that the user was using a cell phone. The default speech model may have assumed a landline connection. In this case, the default speech model selected may not be the best available and an alternative speech model for cell phone use should be selected at 62. If the analysis of this particular call shows that the default speech model is the best available model, then at 60 the system will select it for use by the recognizer at 68.

As an example of the processing that occurs in 58, assume that a user has interacted with the system a number of times. Further improvements may be made as the user interacts with the system over a period of time and number of sessions. The user may have originally designated that the interaction with the system would occur typically over landline connections. However, after three weeks of using the system and several different sessions, the system may know that the user typically calls in on a cell phone. Additionally, the system may track which speech model was used if adjustments were made during each session and may update the default model to reflect the one most typically used by the system during actual calls.

Other embodiments are possible. The speech recognition system could initially interact with the user with the default speech model and then switch to a different model after some period of time into the call, allowing more data to be gathered about the call either manually from the user or automatically by analysis of the audio stream characteristics. The particular sequencing of these steps is left to the system designer.

In this manner, the speech recognition system may more closely tailor the speech model used to convert speech to commands and/or content. This results in improved speech recognition performance as the system can more accurately recognize the user's speech.

The methods of the invention may be included on an article, such as a computer-readable disk or downloadable file. The article would contain instructions that, when executed, would result in the methods of the invention. The execution of these instructions may be on any type of controller such as a general-purpose processor, a digital signal processor or a microcontroller, as examples. The article could be distributed as an upgrade to existing speech recognition systems, or as part of a new speech recognition system. These are just examples and are not intended to limit the scope of the invention in any way.

Thus, although there has been described to this point a particular embodiment for a method and apparatus for improving speech recognition system performance, it is not intended that such specific references be considered as limitations upon the scope of this invention except in-so-far as set forth in the following claims.

What is claimed is:

1. A method for improving speech recognition performance, the method comprising:
   a) determining initial context information associated with an input speech stream, the initial context information including at least one of a user, personal characteristics of the user and a communication channel characteristics;
   b) identifying at least one appropriate default speech model for the input speech stream;
   c) mapping the initial context information to the at least one appropriate default speech model;
   d) dynamically identifying whether a new speech model has a better fit to the initial context information; and
   e) if the new speech model has a better fit to the initial context information, associating the new speech model with the input speech stream as a new default model.

2. The method of claim 1, wherein the personal characteristics include at least one from the group comprised of: gender, native language, age, ethnicity, and home region.

3. The method of claim 1, wherein the communication channel characteristics include at least one from the group comprised of: type of connection, model of phone, network identifiers, network characteristics and background noise level.

4. The method of claim 1, wherein the method further comprises associating at least one alternative model with the input speech stream.

5. A method for dynamically selecting a speech model, the method comprising:
   a) receiving a call from a user;
   b) determining characteristics of a communications channel through which the call is received;
   c) identifying at least one appropriate default speech model for the call based upon the characteristics of the channel;
   d) selecting the at least one appropriate default speech model;
   e) configuring a speech recognizer to use the selected at least one appropriate default speech model;
   f) dynamically identifying whether a new speech model has a better fit to the characteristics of the communications channel; and
   g) if the new speech model has a better fit to the characteristics of the communications channel, associating the new speech model with the call as a new default speech model and configuring the speech recognizer to use the new default speech model.

6. The method of claim 5, wherein the method further comprises overriding the selected at least one appropriate default speech model by dynamically identifying whether the new default speech model has a better fit to the characteristics of the communications channel based upon at least one of the group comprised of: communication channel characteristics, personal characteristics of the user, and a combination of communication channel characteristics and personal characteristics.

7. The method of claim 5, wherein receiving a call from a user further comprises determining information identifying the user.

8. The method of claim 7, wherein the method further comprises overriding the selected at least one appropriate default speech model by dynamically identifying whether a new default speech model has a better fit to the characteristics of the user based upon at least one of the group comprised of: communication channel characteristics, personal characteristics of the user, and a combination of communication channel characteristics and personal characteristic.

9. An article including instructions that, when executed, result in:
   a) reception of a call from a user;
   b) determination of characteristics of a communications channel through which the call is received;
   c) identification of at least one appropriate default speech model for the call;
   d) selection of the at least one appropriate default speech model based upon the communication channel characteristics;
   e) configuring a speech recognizer to use the selected at least one appropriate default speech model;
   f) dynamically identifying whether a new speech model has a better fit to the characteristics of the channel; and
   g) if the new speech model has a better fit to the characteristics of the communications channel, associating the new speech model with the call as a new default speech model and configuring the speech recognizer to use the new default speech model.

10. The article of claim 9, wherein the article includes further instructions that, when executed, result in determination of information identifying the user.

11. The article of claim 10, wherein the article includes further instructions that, when executed, overrides the selected at least one appropriate default speech model by dynamically identifying whether a new speech model has a better fit to the characteristics of the user and the communications channel based upon at least one of the group comprised of: communication channel characteristics, personal characteristics of the user, and a combination of communication channel characteristics and personal characteristics.

12. A method for dynamically selecting a speech model, the method comprising:
   a) receiving a call from a user;
   b) identifying the user;
   c) accessing user information;
   d) identifying at least one appropriate default speech model for the call;
   e) selecting the at least one appropriate default speech model based upon characteristics of the user determined from the user information;
   f) configuring a speech recognizer to use the selected at least one appropriate default speech model;
   g) dynamically identifying whether a new speech model has a better fit to the characteristics of the user; and
   h) if the new speech model has a better fit to the characteristics of the user, associating the new speech model with the call as a new default model and configuring the speech recognizer to use the new default model.

13. The method of claim 12, wherein the method further comprises determining characteristics of a communications channel through which the call is received.

14. The method of claim 13, wherein the method further comprises overriding the selected at least one appropriate default speech model based upon by dynamically identifying whether a new speech model has a better fit to the characteristics of the user and the communications channel based upon at least one of the group comprised of: communication channel characteristics, personal characteristics of the user, and a combination of communication channel characteristics and personal characteristics.

15. An article including instructions that, when executed, result in:
   a) reception of a call from a user;
   b) identification of the user;
   c) access of user information;
   d) identification of at least one appropriate default speech model for the user call;
   e) selection of the at least one appropriate default speech model based upon characteristics of the user determined from the user information;
   f) configuration of a speech recognizer to use the selected at least one appropriate default speech model;
   g) dynamic identification of whether a new speech model has a better fit to the characteristics of the user, and if the new speech model has a better fit to the characteristics of the user, association of the new speech model with the call as a new default model; and
   h) a speech recognizer to use the selected default model.

16. The article of claim 15 wherein the article further includes instructions that, when executed, result in determination of characteristics of a communications channel through which the call is received.

17. The article of claim 16, wherein the article further includes instructions that, when executed, result in overriding the selected at least one appropriate default speech model based upon by dynamically identifying whether a new speech model has a better fit to the characteristics of the user and the communications channel based upon at least one of the group comprised of: communication channel characteristics, personal characteristics of the user, and a combination of communication channel characteristics and personal characteristics.

18. A speech recognition system, comprising:
   a) at least two speech models;
   b) a control module operable to:
      i) determine initial context information about a call the initial context information including at least one of a user, personal characteristics of the user and a communication channel characteristics;
      ii) identify at least one appropriate default speech model from the at least two speech models;
      iii) select the at least one appropriate default speech model based on the initial context in formation; and
      iv) configure a speech recognizer to use the selected at least one appropriate default speech model;
      v) dynamically identify whether a new speech model has a better fit to the characteristics of the initial context information; and
      vi) if the new speech model has a better fit to the initial context information, associating the new speech model with the call as a new default speech model; and
   c) a recognition engine operable to:
      i) receive an input speech stream;
      ii) receive information from the control module about an appropriate speech model to use;
      iii) convert an input speech stream to an output text stream using the appropriate speech model.

* * * * *